United States Patent
Johnsen et al.

(10) Patent No.: US 11,933,156 B2
(45) Date of Patent: Mar. 19, 2024

(54) CONTROLLER AUGMENTING EXISTING CONTROL SYSTEM

(71) Applicant: Schlumberger Technology Corporation, Sugar Land, TX (US)

(72) Inventors: Joergen K Johnsen, Houston, TX (US); Hugo Rosano, Kristiansand (NO); Mahmoud Hadi, Houston, TX (US); Jason Enderby, Kristiansand (NO); Mbaga Louis Ahorukomeye, Houston, TX (US); Yuzhen Xue, Houston, TX (US); Rui Pan, Houston, TX (US); Juan Jose Rojas, Kristiansand (NO)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 616 days.

(21) Appl. No.: 16/860,291

(22) Filed: Apr. 28, 2020

(65) Prior Publication Data
US 2021/0332689 A1    Oct. 28, 2021

(51) Int. Cl.
| | |
|---|---|
| E21B 44/00 | (2006.01) |
| E21B 3/02 | (2006.01) |
| E21B 21/08 | (2006.01) |
| G05B 19/05 | (2006.01) |

(52) U.S. Cl.
CPC .............. *E21B 44/00* (2013.01); *E21B 3/022* (2020.05); *E21B 21/08* (2013.01); *G05B 19/05* (2013.01); *G05B 2219/1105* (2013.01); *G05B 2219/13167* (2013.01); *G05B 2219/14008* (2013.01); *G05B 2219/45129* (2013.01)

(58) Field of Classification Search
CPC .......... E21B 44/00; E21B 21/08; G05B 19/05
USPC ........................................................ 700/275
See application file for complete search history.

(56) References Cited

U.S. PATENT DOCUMENTS

| | | | |
|---|---|---|---|
| 1,020,837 | A | 3/1912 | Morgan |
| 4,875,530 | A | 10/1989 | Frink et al. |
| 6,050,348 | A | 4/2000 | Richarson et al. |
| 6,166,654 | A | 12/2000 | Van Den Steen |
| 6,327,539 | B1 | 12/2001 | Keultjes et al. |
| 6,338,390 | B1 | 1/2002 | Tibbitts |
| 6,382,331 | B1 | 5/2002 | Pinckard |

(Continued)

FOREIGN PATENT DOCUMENTS

| | | |
|---|---|---|
| CN | 102108854 A | 6/2011 |
| WO | 2018213925 A1 | 11/2018 |

(Continued)

OTHER PUBLICATIONS

Search Report and Written Opinion of International Patent Application No. PCT/US2021/029258 dated Aug. 19, 2021; 10 pages.

(Continued)

*Primary Examiner* — Md Azad

(57) ABSTRACT

An augmenting controller for augmenting control of an actuator by a component controller. The actuator is operable to change an operational parameter of a component of a drilling rig. The component controller is configured for communicating control signals to the actuator to control the actuator and thereby control operation of the component. The augmenting controller is operable to augment the control signals.

19 Claims, 3 Drawing Sheets

(56) References Cited

U.S. PATENT DOCUMENTS

| | | | |
|---|---|---|---|
| 6,802,378 B2 | 10/2004 | Haci et al. | |
| 6,907,375 B2 | 6/2005 | Guggari et al. | |
| 6,918,453 B2 | 7/2005 | Haci et al. | |
| 6,944,547 B2 | 9/2005 | Womer et al. | |
| 7,096,979 B2 | 8/2006 | Haci et al. | |
| 7,100,708 B2 | 9/2006 | Koederitz | |
| 7,152,696 B2 | 12/2006 | Jones | |
| 7,404,454 B2 | 7/2008 | Hulick | |
| 7,422,076 B2 | 9/2008 | Koederitz et al. | |
| 7,461,705 B2* | 12/2008 | Hulick | E21B 7/24 175/57 |
| 7,588,100 B2 | 9/2009 | Hamilton | |
| 7,802,634 B2 | 9/2010 | Boone | |
| 7,810,584 B2 | 10/2010 | Haci et al. | |
| 7,823,655 B2 | 11/2010 | Boone et al. | |
| 7,946,356 B2 | 5/2011 | Koederitz et al. | |
| 8,215,417 B2 | 7/2012 | Annaiyappa et al. | |
| 8,360,171 B2 | 1/2013 | Boone et al. | |
| 8,387,720 B1 | 3/2013 | Keast et al. | |
| 8,528,663 B2 | 9/2013 | Boone | |
| 8,602,126 B2 | 12/2013 | Boone et al. | |
| 8,672,055 B2 | 3/2014 | Boone et al. | |
| 8,689,906 B2 | 4/2014 | Nessjoen et al. | |
| RE44,956 E | 6/2014 | Richardson et al. | |
| RE44,973 E | 7/2014 | Richardson et al. | |
| 8,833,488 B2 | 9/2014 | Knudsen et al. | |
| 8,939,233 B2 | 1/2015 | Edbury et al. | |
| 8,939,234 B2 | 1/2015 | Mebane, III et al. | |
| 8,950,512 B2 | 2/2015 | Nessjoen et al. | |
| 9,080,428 B1 | 7/2015 | Rembach et al. | |
| 9,145,768 B2 | 9/2015 | Normore et al. | |
| 9,181,792 B2 | 11/2015 | Pena | |
| 9,249,655 B1 | 2/2016 | Keast et al. | |
| 9,290,995 B2 | 3/2016 | Boone et al. | |
| 9,309,760 B2 | 4/2016 | Haci et al. | |
| 9,359,881 B2 | 6/2016 | DiSantis | |
| 9,404,307 B2 | 8/2016 | Maidla | |
| 9,424,667 B2 | 8/2016 | Pena et al. | |
| 9,506,336 B2 | 11/2016 | Orbell | |
| 9,540,879 B2* | 1/2017 | Kolpack | E21B 44/00 |
| 9,581,008 B2 | 2/2017 | Kyllingstad | |
| 9,593,567 B2 | 3/2017 | Pink et al. | |
| 9,598,904 B2 | 3/2017 | Aldred et al. | |
| 9,650,880 B2 | 5/2017 | Bowley et al. | |
| 9,689,250 B2 | 6/2017 | Badkoubeh et al. | |
| 9,726,003 B2 | 8/2017 | Pettapiece et al. | |
| 9,784,035 B2 | 10/2017 | Boone et al. | |
| 9,885,231 B2 | 2/2018 | Nessjoen et al. | |
| 9,920,612 B2 | 3/2018 | Dwars et al. | |
| 9,932,811 B2 | 4/2018 | Dwars et al. | |
| 9,952,119 B2 | 4/2018 | Simanjuntak et al. | |
| 10,036,678 B2 | 7/2018 | Fisher, Jr. et al. | |
| 10,053,971 B2 | 8/2018 | Lai et al. | |
| 10,067,973 B2 | 9/2018 | Moore | |
| 10,125,598 B2 | 11/2018 | Dykstra et al. | |
| 10,138,723 B2 | 11/2018 | Pettapiece et al. | |
| 10,198,159 B2 | 2/2019 | Ziegler et al. | |
| 10,202,837 B2 | 2/2019 | Ng et al. | |
| 10,208,580 B2 | 2/2019 | Benson et al. | |
| 10,233,740 B2 | 3/2019 | Patterson et al. | |
| 10,260,331 B2 | 4/2019 | Viens et al. | |
| 10,260,332 B2 | 4/2019 | Israel et al. | |
| 10,275,715 B2 | 4/2019 | Laing et al. | |
| 10,301,877 B2 | 5/2019 | Schaaf et al. | |
| 10,378,282 B2 | 8/2019 | Hadi et al. | |
| 10,415,363 B2 | 9/2019 | Mauldin et al. | |
| 10,415,368 B2 | 9/2019 | Pettapiece et al. | |
| 10,472,944 B2 | 11/2019 | Wassell | |
| 10,487,642 B2 | 11/2019 | Haci et al. | |
| 10,533,409 B2 | 1/2020 | Benson et al. | |
| 10,550,683 B2 | 2/2020 | Dykstra et al. | |
| 10,563,497 B2* | 2/2020 | Dykstra | E21B 44/00 |
| 10,883,357 B1* | 1/2021 | Orbell | E21B 47/06 |
| 2006/0096786 A1 | 5/2006 | Wells | |
| 2010/0147510 A1* | 6/2010 | Kwok | E21B 41/00 700/275 |
| 2014/0196949 A1 | 7/2014 | Hareland et al. | |
| 2014/0305702 A1 | 10/2014 | Bowley et al. | |
| 2015/0241871 A1 | 8/2015 | Yoshino et al. | |
| 2016/0047219 A1 | 2/2016 | Jeffryes | |
| 2016/0252897 A1* | 9/2016 | Ashok | G05B 19/4155 700/275 |
| 2016/0290120 A1* | 10/2016 | Zheng | G05B 15/02 |
| 2017/0101861 A1 | 4/2017 | Kyllingstad | |
| 2018/0135401 A1 | 5/2018 | Dykstra et al. | |
| 2018/0149010 A1 | 5/2018 | Zheng et al. | |
| 2018/0149012 A1 | 5/2018 | Dwars et al. | |
| 2018/0283137 A1* | 10/2018 | Peyregne | E21B 34/02 |
| 2018/0283157 A1 | 10/2018 | Hadi et al. | |
| 2018/0328159 A1 | 11/2018 | Mandava et al. | |
| 2018/0334898 A1 | 11/2018 | Zha et al. | |
| 2018/0363392 A1 | 12/2018 | Brandsvoll et al. | |
| 2019/0032466 A1 | 1/2019 | Wilson et al. | |
| 2019/0048706 A1 | 2/2019 | Benson et al. | |
| 2019/0049323 A1 | 2/2019 | Martin et al. | |
| 2019/0106976 A1 | 4/2019 | Badgwell et al. | |
| 2019/0106979 A1 | 4/2019 | Hadi et al. | |
| 2019/0120039 A1 | 4/2019 | Gillan | |
| 2019/0120040 A1 | 4/2019 | Zhao et al. | |
| 2019/0145240 A1 | 5/2019 | Benson et al. | |
| 2019/0187012 A1 | 6/2019 | Wu et al. | |
| 2020/0003046 A1 | 1/2020 | Zheng et al. | |
| 2020/0378237 A1 | 12/2020 | Wicks et al. | |
| 2021/0011048 A1 | 1/2021 | Wu et al. | |

FOREIGN PATENT DOCUMENTS

| | | |
|---|---|---|
| WO | 2019050824 A1 | 3/2019 |
| WO | 2019066930 A1 | 4/2019 |
| WO | 2019074623 A1 | 4/2019 |
| WO | 2019165334 A1 | 8/2019 |
| WO | 2019232516 A1 | 12/2019 |

OTHER PUBLICATIONS

Electro Project, Soft Torque, accessed Apr. 27, 2020, 2 pages; <https://www.softtorque.com/soft-torque/what-is-ep-soft-torque>.

* cited by examiner

CONTROLLER AUGMENTING EXISTING CONTROL SYSTEM

BACKGROUND OF THE DISCLOSURE

Existing drilling rigs include various components controlled by corresponding actuators. Some of the actuators are controlled by programmable logic controllers (PLCs). However, the PLCs are often not able to cause the actuators and (thus) their controlled components to perform advanced operations, particularly operations developed years after the PLCs were initially deployed. For example, existing rig control systems are often restricted to being handled by its core technologies, thus prohibiting integration of new technologies. The existing PLCs also may not have sufficient processing power and/or communication speed/bandwidth to perform the advanced operations.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus that includes an augmenting controller for augmenting control of an actuator by a component controller. The actuator is operable to change an operational parameter of a component of a drilling rig. The component controller is configured for communicating control signals to the actuator to control the actuator and thereby control operation of the component. The augmenting controller is operable to augment the control signals.

The present disclosure also introduces a system that includes an actuator, a first controller, and a second controller. The actuator is operable to change an operational parameter of a drilling rig component. The first controller is configured for communicating control signals to the actuator to control the actuator and thereby control operation of the component. The second controller is connected between the first controller and the actuator and is operable to alter the control signals.

The present disclosure also introduces a method that includes electronically connecting an augmenting controller to an actuator. The actuator is operable to change an operational parameter of a component of a drilling rig. A component controller is configured for communicating control signals to the actuator to control the actuator and thereby control operation of the component. The method also includes causing operation of the augmenting controller. Operation of the augmenting controller includes augmenting the control signals to thereby augment control of the actuator by the component controller.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
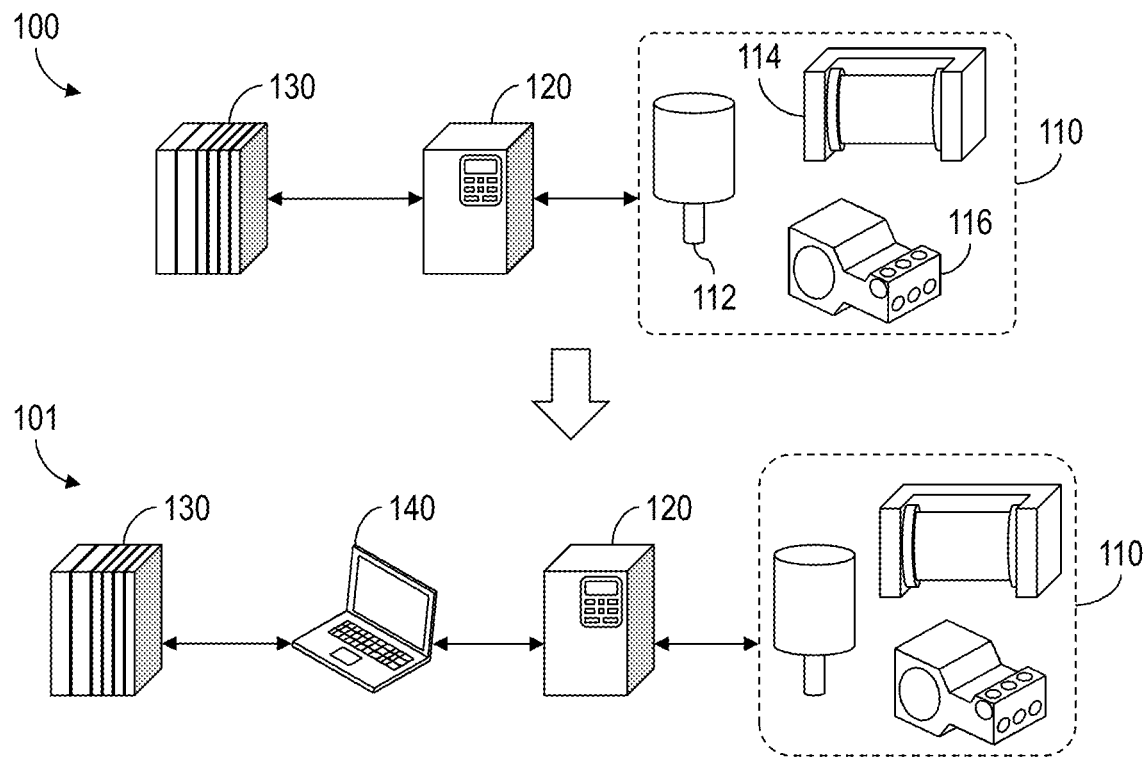
FIG. 1 is a schematic view of at least a portion of an example implementation of a system according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

FIG. 1 is a schematic view of at least a portion of an example implementation of a preexisting system 100 according to one or more aspects introduced by the present disclosure. The system 100 comprises a drilling rig component 110, an actuator 120 in communication with and/or otherwise operable to control operation of the component 110, and a controller 130 in communication with the actuator 120 and operable to communication control signals to the actuator 120.

The component 110 depicted in FIG. 1 is representative of various drilling rig components that may be operated in conjunction with an augmenting controller 140 according to one or more aspects of the present disclosure. For example, the component 110 may be a top drive 112, a drawworks 114, or one or more mud pumps 116. However, the component 110 may also or instead be or comprise one or more other drilling rig components, such as an iron roughneck and/or other tubular handling equipment, and/or a choke, a return valve, and/or other valves, among other examples.

The actuator 120 is depicted as a variable frequency drive (VFD) for driving an alternating-current (AC) motor of the component 110. Thus, in the context of the present disclosure, the actuator 120 is not limited to conventional "actuators" that convert a form of energy to a mechanical motion.

In addition, the actuator 120 may be or comprise other types of drives, servos, solenoids, pistons/cylinders (e.g., hydraulic or pneumatic), and/or other types of actuators that can be operated via control signals communicated from the controller 130 in order to control operation of the component 110.

The controller 130 is a PLC and/or other controller specifically designed and/or programmed to communicate control signals to the actuator 120 in order to control the actuator 120 and, thereby, the component 110. For example, the controller 130 is likely not a PC-based controller. The controller 130 is not able to cause the actuator 120 and the component 110 to perform one or more drilling domain applications for various reasons. For example, the controller 130 may simply not be programmed for such drilling domain applications, or the controller 130 may lack the physical processing power, memory, and/or communication means sufficient to perform such drilling domain applications. The controller 130 may also (or instead) not be compatible with higher level programming languages often utilized in solving advanced mathematics and/or optimization problems integral to the drilling domain applications. The controller 130 may also (or instead) not be configured or configurable for storing and retrieving data from a database system utilized by the drilling domain applications. The controller 130 may also (or instead) have a vendor-specific IDE (integrated development environment) and/or programming language that may prevent performing the drilling domain applications, and which may also limit portability and/or re-use between rig control systems from different vendors. The controller 130 may also (or instead) comprise an operating system that lacks support for advanced computation functions utilized by the drilling domain applications.

FIG. 1 also depicts the system 100 after the interconnection of the augmenting controller 140. For the sake of clarity, the preexisting system 100 with the interconnected augmenting controller 140 may be referred to herein as the augmented system 101.

The augmenting controller 140 augments and/or supports the preexisting control system 100 in the form of a PC-based controller that is installed on a preexisting drilling rig comprising the system 100. The augmenting controller 140 processes algorithms that are related to drilling domain applications and integrates the drilling domain applications with the preexisting control system 100.

Figure 2:
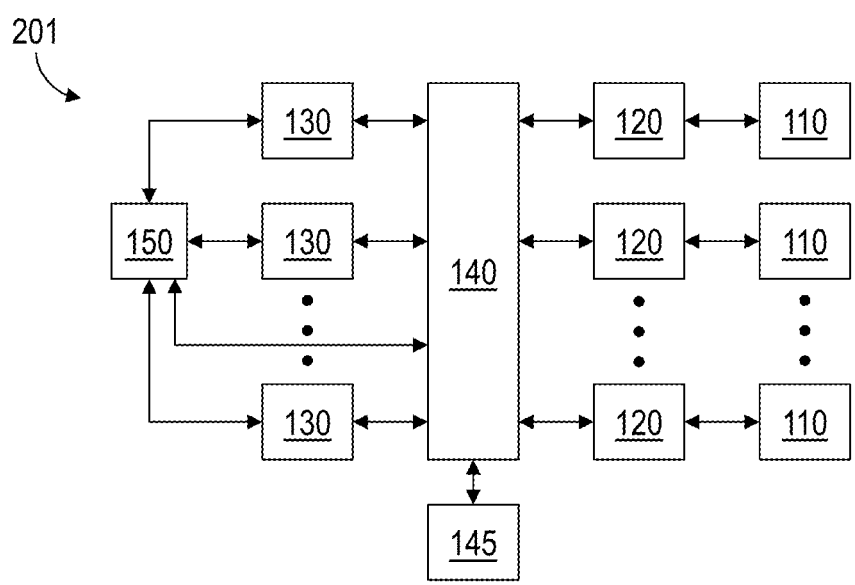
FIG. 2 is a schematic view of at least a portion of another example implementation of the system shown in FIG. 1 according to one or more aspects of the present disclosure.

FIG. 2 is a schematic view of at least a portion of another example implementation of the augmented system 101 shown in FIG. 1, designated by reference number 201 in FIG. 2. The augmented system 201 is formed by interconnecting the augmenting controller 140 into a preexisting system comprising multiple instances of the actuator 120 and multiple instances of the controller 130 to provide augmented control of multiple instances of the component 110 of the preexisting system. For example, the components 110 depicted in FIG. 2 may include a top drive, a drawworks, one or more mud pumps, a choke valve, and other components of a preexisting drilling rig. Each component 110 may be driven by a dedicated VFD and/or other actuator 120 in response to control signals communicated from the corresponding controller 130. However, each component 110 may also be driven by the augmenting controller 140, including in manners not possible in the preexisting system before the interconnection of the augmenting controller 140.

FIG. 2 also demonstrates that the augmenting controller 140 may comprise or be connected with a dedicated human-machine interface (HMI) 145. The HMI 145 is separate from the one or more HMIs 150 of the preexisting drilling rig system. However, introducing the augmenting controller 140 into the preexisting drilling rig system may include connecting the augmenting controller 140 with the one or more HMIs 150. Thus, the augmenting controller 140 may be in communication with the HMI 145, the HMI(s) 150, or both. The introduced HMI 145 may be utilized by rig personnel to enter commands that may be communicated to the augmenting controller 140 and/or to monitor data and/or other information communicated from the augmenting controller 140. The existing HMI(s) 150 may be utilized by rig personnel to enter commands that may be communicated to the preexisting controllers 130 and/or to monitor data and/or information communication from the controllers 130.

Figure 3:
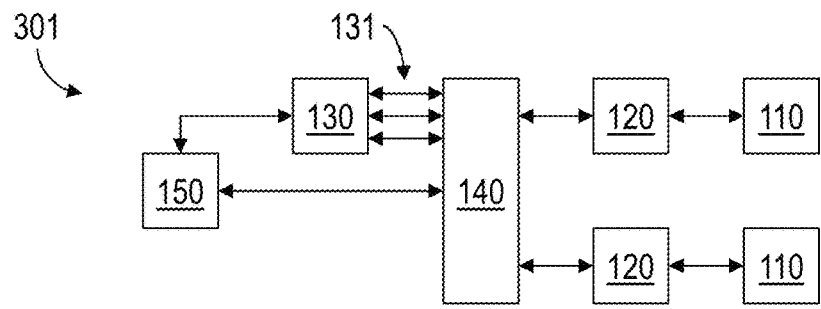
FIG. 3 is a schematic view of at least a portion of another example implementation of the systems shown in FIGS. 1 and 2 according to one or more aspects of the present disclosure.

FIG. 3 is a schematic view of at least a portion of another example implementation of the augmented system 201 shown in FIG. 2, designated by reference number 301 in FIG. 3. The augmented system 301 is formed by interconnecting the augmenting controller 140 into a preexisting system comprising multiple instances of the actuator 120 but just a single instance of the controller 130 to provide augmented control of multiple instances of the component 110 of the preexisting system. That is, in the preexisting system, the controller 130 was used to control multiple actuators 120 and, thereby, multiple components 110. With the introduction of the augmenting controller 140, the multiple actuators 120 may instead or also be controlled by the augmenting controller 140. However, in such implementations, the multiple actuators 120 may be controlled via different protocols/languages, thus there may be additional connections 131 between the preexisting controller 130 and the augmenting controller 140, so that it will appear to the preexisting controller 130 that it remains connected to the different actuators 120.

Figure 4:
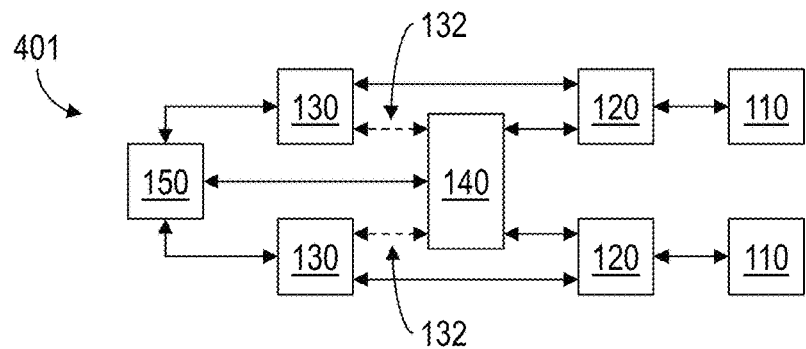
FIG. 4 is a schematic view of at least a portion of another example implementation of the systems shown in FIGS. 1-3 according to one or more aspects of the present disclosure.

FIG. 4 is a schematic view of at least a portion of another example implementation of the augmented system 201 shown in FIG. 2, designated by reference number 401 in FIG. 4. The augmented system 401 is formed by interconnecting the augmenting controller 140 into a preexisting system comprising two actuators 120 and two controllers 130 to provide augmented control of two components 110 of the preexisting system. However, while the augmenting controller 140 in the system 201 shown in FIG. 2 is connected in series between the controllers 130 and the actuators, the augmenting controller 140 in the system 401 shown in FIG. 4 is connected to the actuators 120 in parallel with the controllers 130. Thus, each controller 130 may remain in direct connection and communication with the corresponding actuators 120. In such implementations, the augmenting controller 140 may or may not be connected directly to the controllers 130, as indicated in FIG. 4 by dashed arrows 132.

Figure 5:
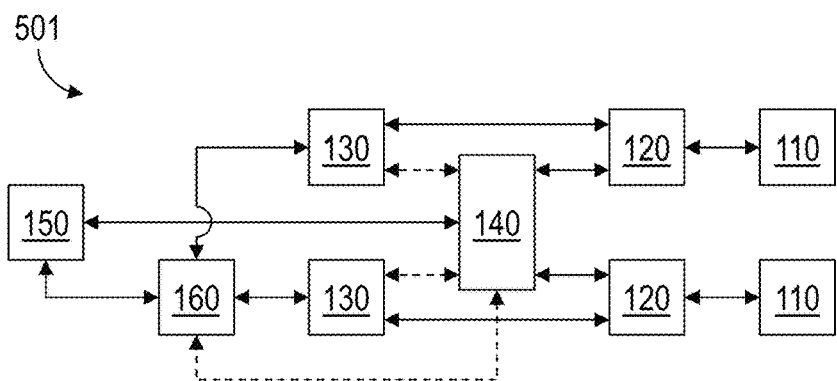
FIG. 5 is a schematic view of at least a portion of another example implementation of the systems shown in FIGS. 1-4 according to one or more aspects of the present disclosure.

FIG. 5 is a schematic view of at least a portion of another example implementation of the augmented system 401 shown in FIG. 4, designated by reference number 501 in FIG. 5. The augmented system 501 shown in FIG. 5 is the same as the augmented system 401 shown in FIG. 4 except that the augmented system 501 also comprises a gateway or coordinating controller 160. This additional controller 160 may be connected to and communicate with each of the preexisting controllers 130. The controller 160 may be part of the preexisting system from which the augmented system 501 is formed by interconnecting the augmenting controller 140. The controller 160 may also connect directly to the augmenting controller 140, as indicated by the dashed line in FIG. 5. For example, the direct connection between the controller 160 and the augmenting controller 140 may be in lieu of the direct connection between the HMI 150 and the augmenting controller 140, such that the HMI 150 is directly connected to and communicates with the controller 160 but no other components.

In each of the augmented systems described above, as well as others within the scope of the present disclosure, the augmenting controller 140 may permit the preexisting drilling rig systems to be utilized with drilling domain applications that aren't available absent the augmenting controller 140. For example, the drilling domain applications may call for processing power and applications beyond the capabilities of a typical PLC (e.g., the controller 130), such as calling pre-build libraries (e.g., dll files) that are compiled using advanced analytical and/or control software, such as MATLAB and/or SIMULINK. Integrating the augmenting controller 140 into the preexisting system 100 permits the augmenting controller 140 to have direct access to the actuator(s) 120 in order to deploy improved drilling domain applications that utilize fast deterministic control loops that, for example, run at a minimum update rate of two milliseconds.

The augmenting controller 140 may be utilized to enhance drilling performance of a drilling rig comprising the augmented system 101 via execution of the drilling domain applications deployed on the augmenting controller 140. The augmenting controller 140 and the PC-based drilling domain applications may permit execution of real-time control applications. The augmenting controller 140 and the PC-based drilling domain applications may also introduce the otherwise missing ability to exchange data between PC-based applications and real-time applications within less than ten milliseconds. The augmenting controller 140 and the PC-based drilling domain applications may also introduce the ability to support of a wide range of industrial communication protocols, such as PROFIBUS, PROFINET, CAN bus, ETHERCAT, Ethernet/IP, MODBUS, and/or others. The PC-based applications may be developed using different programing environments, such as C#, C++, JAVA, JAVASCRIPT, MATLAB, PYTHON, and/or others. The real-time applications may be developed using soft PLC platforms, such as CODESYS, TWINCAT, and/or others.

The augmenting controller 140 may pass through commands from the controller 130 to the actuator 120 when, for example, the augmenting controller 140 is not running a drilling domain application. If a particular rig operation calls for a certain drilling domain application, then the augmenting controller 140 can modify communication packets received from the controller 130 to implement the drilling domain application algorithm.

One or more of the drilling domain applications deployed by the augmenting controller 140 may be for stick-slip mitigation and/or controlled drill string oscillation (e.g., for sliding drilling). In such implementations, the actuator 120 controlled by the augmenting controller 140 may be the VFD that is driving the top drive. Another one or more of the drilling domain applications deployed by the augmenting controller 140 may be for auto-tune or adaptive or multi-variable automatic drilling. In such implementations, the actuators 120 controlled by the augmenting controller 140 may be the VFDs driving the drawworks and the top drive. Another one or more of the drilling domain applications deployed by the augmenting controller 140 may be for mud pump synchronization and pressure control. In such implementations, the actuator(s) 120 controlled by the augmenting controller 140 may be the VFD(s) driving the mud pump(s). Another one or more of the drilling domain applications deployed by the augmenting controller 140 may be for managed-pressure drilling. In such implementations, the actuators 120 controlled by the augmenting controller 140 may the VFDs and/or other actuators driving mud pumps, return valves, choke valves, and the like.

The augmenting controller 140 may mimic the interfaces between the controller 130 and the actuator 120 so that, for example, the software and/or hardware configuration of the controller 130 need not be modified when interconnecting the augmenting controller 140. Thus, the augmenting controller 140 may be agnostic to the controller 130, the actuator 120, or both. Moreover, the augmenting controller 140 may be configured to handle each of the different communication interfaces of the controllers and actuators of a typical rig control system, such that the augmenting controller 140 may be integrated with the vast majority of preexisting drilling rig control systems.

The augmenting controller 140 may also provide direct interfaces to other monitoring systems, such as historical databases, data exporters, and other examples. The augmenting controller 140 may also provide direct interfaces to other graphical user interfaces (GUIs), such as a control HMI, a calibration tool, a monitoring tool, a commissioning tool, and other examples. This may permit the augmented system to send and receive information directly without having to expand communication channels in the existing control system, including where expanding communication in a preexisting control system is restricted by vendors and operators for security reasons and requires a significant effort.

The augmenting controller 140 may be considered to have three operational modes. In a first "pass-through" mode, the augmenting controller 140 may merely pass through commands from the controller 130 to the actuator 120. In a second "advanced-control" mode, the augmenting controller 140 may generate and send commands to the actuator 120 to perform a drilling domain application not able to be performed by the controller 130. In a third "augmented-control" mode, the augmenting controller 140 may augment (e.g., block, change, and/or add to) commands from the controller 130 before sending them to the actuator 120.

The different operational modes may depend on how the augmenting controller 140 is interconnected into the preexisting system. For example, the augmenting controller 140 may be interconnected into the preexisting system in a serial configuration, in which the augmenting controller 140 is connected between the existing controller 130 and the existing actuator 120, such as shown in FIGS. 1 and 2. In this configuration, the augmenting controller 140 may operate in the pass-through mode or the augmented-control mode. For example, in the augmented-control mode of operation with the serial configuration, commands from the controller 130 may be augmented by the augmenting controller 140 to perform a drilling application and/or other applications that are not very critical in time (e.g., a pipe oscillator application).

In a parallel configuration, the controller 130 is directly connected to the actuator 120 and the augmenting controller 140 is connected to the actuator 120 using a second communication port on the actuator 120, such as shown in FIGS. 4 and 5, absent the dashed lines 132. In this configuration, the augmenting controller 140 may operate in the advanced-control mode to generate and send control commands to the actuator 120 to perform a drilling application not able to be performed in the absence of the augmenting controller 140.

In a hybrid configuration, the augmenting controller 140 is connected between the controller 130 and the actuator 120 and is also connected parallelly to the actuator 120 using a second communication port. In this configuration, the augmenting controller 140 may operate in each of the pass-through, advanced-control, and the augmented-control modes.

The augmenting controller 140 may implement an internal web interface (e.g., WebUI) and a REST (REpresentational State Transfer) API (application program interface) for the drilling domain applications hosted thereon. The controller 130 may develop the application screens and interface with the augmenting controller 140 using the REST API, or the controller 130 may simply host the WebUI within one of the controller 130 screens, or a separate HMI may be installed on the rig (e.g., at the driller's chair) for displaying the drilling domain application WebUI. The interface may be done using the HMI software that is running on the HMI 150. However, the interface to the HMI may be provided by passing variables from the HMI 150 to the controller 130 and then to the augmenting controller 140.

Figure 6:
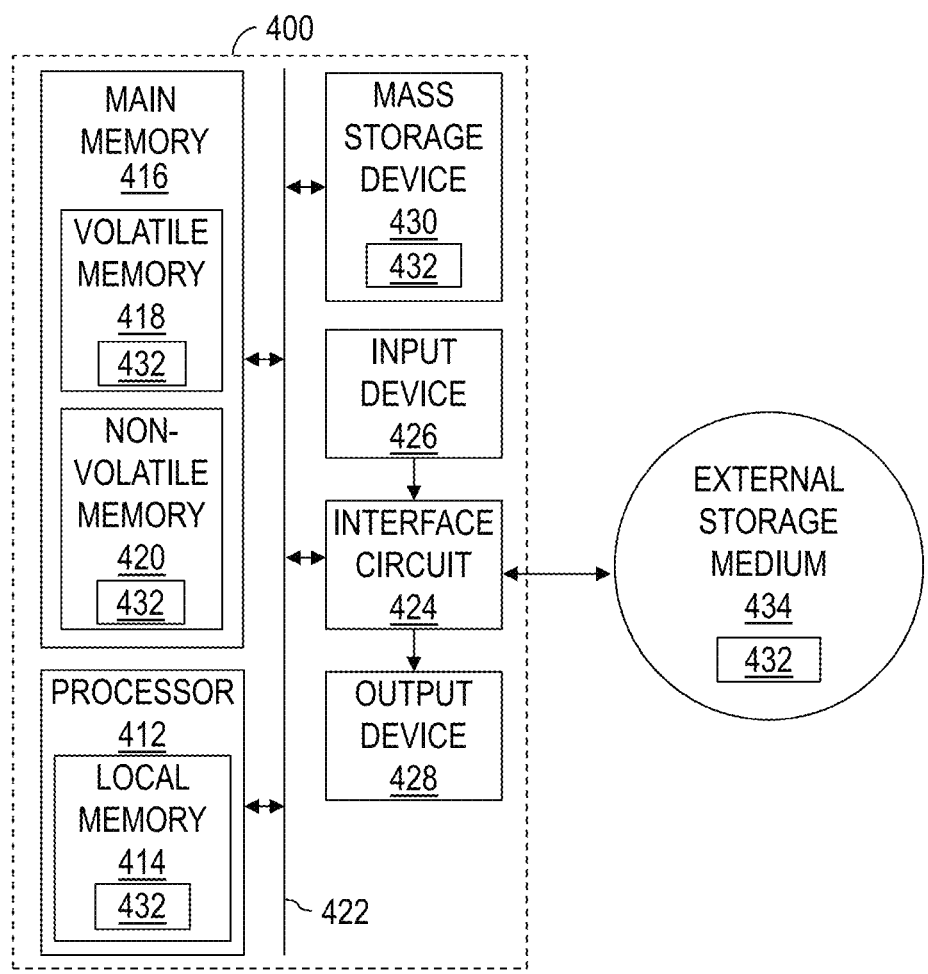
FIG. 6 is a schematic view of at least a portion of an example implementation of a processing system according to one or more aspects of the present disclosure.

FIG. 6 is a schematic view of at least a portion of an example implementation of a processing device 400 (or system) according to one or more aspects of the present disclosure. The processing device 400 may be or form at least a portion of one or more instances of one or more of the actuator 120, the controller 130, the augmenting controller 140, the HMI 145, the HMI 150, and/or the controller 160 described above. The processing device 400 may be or comprise, for example, one or more processors, controllers, special-purpose computing devices, PCs (e.g., desktop, laptop, and/or tablet computers), personal digital assistants, smartphones, IPCs, PLCs, servers, internet appliances, and/or other types of computing devices.

The processing device 400 may comprise a processor 412, such as a general-purpose programmable processor. The processor 412 may comprise a local memory 414 and may execute machine-readable and executable program code instructions 432 (i.e., computer program code) present in the local memory 414 and/or another memory device. The processor 412 may be, comprise, or be implemented by one or more processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and processors based on a multi-core processor architecture, as non-limiting examples. Examples of the processor 412 include one or more INTEL microprocessors, microcontrollers from the ARM and/or PICO families of microcontrollers, and/or embedded soft/hard processors in one or more FPGAs. The processor 412 may execute, among other things, the program code instructions 432 and/or other instructions and/or programs to implement the example methods and/or operations described herein.

The processor 412 may be in communication with a main memory 416, such as may include a volatile memory 418 and a non-volatile memory 420, perhaps via a bus 422 and/or other communication means. The volatile memory 418 may be, comprise, or be implemented by random access memory (RAM), static RAM (SRAM), dynamic RAM (DRAM), synchronous DRAM (SDRAM), RAMBUS DRAM (RDRAM), and/or other types of RAM devices. The non-volatile memory 420 may be, comprise, or be implemented by read-only memory, flash memory, and/or other types of memory devices. One or more memory controllers (not shown) may control access to the volatile memory 418 and/or non-volatile memory 420.

The processing device 400 may also comprise an interface circuit 424, which is in communication with the processor 412, such as via the bus 422. The interface circuit 424 may be, comprise, or be implemented by various types of standard interfaces, such as an Ethernet interface, a universal serial bus (USB), a third-generation input/output (3GIO) interface, a wireless interface, a cellular interface, and/or a satellite interface, among others. The interface circuit 424 may comprise a graphics driver card. The interface circuit 424 may comprise a communication device, such as a modem or network interface card to facilitate exchange of data with external computing devices via a network (e.g., Ethernet connection, digital subscriber line (DSL), telephone line, coaxial cable, cellular telephone system, satellite, etc.). The interface circuit 424 can facilitate communications between the processing device 400 and one or more devices by utilizing one or more communication protocols, such as an Ethernet-based network protocol (such as ProfiNET, OPC, OPC/UA, Modbus TCP/IP, EtherCAT, UDP multicast, Siemens S7 communication, or the like), a proprietary communication protocol, and/or another communication protocol.

One or more input devices 426 may also be connected to the interface circuit 424. The input devices 426 may permit rig personnel to enter the program code instructions 432, which may be or comprise control data, operational parameters, operational set-points, a well construction plan, and/or a database of operational sequences. The program code instructions 432 may further comprise the drilling domain applications described above, as well as other programs operable to perform example methods and/or operations described herein. The input devices 426 may be, comprise, or be implemented by a keyboard, a mouse, a joystick, a touchscreen, a track-pad, a trackball, an isopoint, and/or a voice recognition system, among other examples. One or more output devices 428 may also be connected to the interface circuit 424. The output devices 428 may permit for visualization or other sensory perception of various data, such as sensor data, status data, and/or other example data. The output devices 428 may be, comprise, or be implemented by video output devices (e.g., an LCD, an LED display, a CRT display, a touchscreen, etc.), printers, and/or speakers, among other examples. The one or more input devices 426 and the one or more output devices 428 connected to the interface circuit 424 may, at least in part, facilitate the HMIs described herein.

The processing device 400 may comprise a mass storage device 430 for storing data and program code instructions 432. The mass storage device 430 may be connected to the processor 412, such as via the bus 422. The mass storage device 430 may be or comprise a tangible, non-transitory storage medium, such as a floppy disk drive, a hard disk drive, a compact disk (CD) drive, and/or digital versatile disk (DVD) drive, among other examples. The processing device 400 may be communicatively connected with an external storage medium 434 via the interface circuit 424. The external storage medium 434 may be or comprise a removable storage medium (e.g., a CD or DVD), such as may be operable to store data and program code instructions 432.

As described above, the program code instructions 432 may be stored in the mass storage device 430, the main memory 416, the local memory 414, and/or the removable storage medium 434. Thus, the processing device 400 may be implemented in accordance with hardware (perhaps implemented in one or more chips including an integrated circuit, such as an ASIC), or may be implemented as software or firmware for execution by the processor 412. In the case of firmware or software, the implementation may be provided as a computer program product including a non-transitory, computer-readable medium or storage structure embodying computer program code instructions 432 (i.e., software or firmware) thereon for execution by the processor 412. The program code instructions 432 may include program instructions or computer program code that, when executed by the processor 412, may perform and/or cause performance of example applications, methods, processes, and/or operations described herein.

In view of the entirety of the present disclosure, including the figures and the claims, a person having ordinary skill in the art will readily recognize that the present disclosure introduces an apparatus comprising an augmenting controller for augmenting control of an actuator by a component controller, wherein: the actuator is operable to change an operational parameter of a component of a drilling rig; the component controller is configured for communicating control signals to the actuator to control the actuator and thereby control operation of the component; and the augmenting controller is operable to augment the control signals.

The control signals may be first control signals and the augmenting controller may be operable to generate and communicate second control signals to the actuator. The second control signals may cause the actuator to perform an operation not able to be caused by the component controller.

The component controller may not communicate with the actuator other than through the augmenting controller.

The component controller may communicate directly with the actuator.

The actuator may be a VFD. The component may be a top drive driven by operation of the VFD, a drawworks driven by operation of the VFD, or a mud pump system driven by operation of the VFD.

The component may be a choke.

The component controller may be a PLC. In such implementations, among others within the scope of the present disclosure, the augmenting controller may not be a PLC. For example, the augmenting controller may be a PC-based controller.

The augmenting controller may process algorithms that are related to drilling domain applications and may integrate the drilling domain applications with the component controller. The component controller may not be able to be programmed to process the algorithms. The component controller may not have sufficient memory and/or processing power to process the algorithms. The augmenting controller may be agnostic to the component controller, the actuator, or both.

The drilling domain applications may include an algorithm to mitigate stick-slip occurrence during drilling. In such implementations, among others within the scope of the present disclosure, the actuator may be a VFD and the component is a top drive driven by operation of the VFD.

The drilling domain applications may include an algorithm to automatically control drilling. In such implementations, among others within the scope of the present disclosure, the component controller may be a first component controller, the control signals may be first control signals, the actuator may be a first VFD, the component may be a top drive driven by operation of the first VFD, a second VFD may be operable to change an operational parameter of a drawworks of the drilling rig, a second component controller may be configured for communicating second control signals to the second VFD to control the second VFD and thereby control operation of the drawworks, and the augmenting controller may also be operable to augment the second control signals.

The present disclosure also introduces a system comprising: an actuator operable to change an operational parameter of a drilling rig component; a first controller configured for communicating control signals to the actuator to control the actuator and thereby control operation of the component; and a second controller connected between the first controller and the actuator and operable to alter the control signals.

The first controller may not communicate with the actuator other than through the second controller.

The first controller may communicate directly with the actuator.

The actuator may be a VFD. In such implementations, among others within the scope of the present disclosure, the component may be a top drive driven by operation of the VFD, a drawworks driven by operation of the VFD, or a mud pump system driven by operation of the VFD.

The component may be a choke.

The first controller may be a PLC. In such implementations, among others within the scope of the present disclosure, the second controller may not be a PLC. For example, the second controller may be a PC-based controller.

The second controller may process algorithms that are related to drilling domain applications and may integrate the drilling domain applications with the first controller, and the first controller may not be able to be programmed to process the algorithms. The first controller may not have sufficient memory and/or processing power to process the algorithms. The second controller may be agnostic to the first controller, the actuator, or both.

The drilling domain applications may include an algorithm to mitigate stick-slip occurrence during drilling. In such implementations, among others within the scope of the present disclosure, the actuator may be a VFD and the component may be a top drive driven by operation of the VFD.

The drilling domain applications may include an algorithm to automatically control drilling. In such implementations, among others within the scope of the present disclosure, the control signals may be first control signals, the actuator may be a first VFD, the component may be a top drive driven by operation of the first VFD, and the system may further comprise: a second VFD operable to change an operational parameter of a drawworks; and a third controller configured for communicating second control signals to the second VFD to control the second VFD and thereby control operation of the drawworks, wherein the second controller is also connected between the third controller and the second VFD and is operable to alter the second control signals.

The first controller may comprise a first processor and a first memory comprising first instructions executed by the first processor. The second controller may comprise a second processor and a second memory comprising second instructions executed by the second processor. The first and second processors may each be separate, unitary processors. The first and second memories may each be separate, unitary memories.

The present disclosure also introduces a method comprising: (A) electronically connecting an augmenting controller to an actuator, wherein: (1) the actuator is operable to change an operational parameter of a component of a drilling rig; and (2) a component controller is configured for communicating control signals to the actuator to control the actuator and thereby control operation of the component; and (B) causing operation of the augmenting controller, wherein operation of the augmenting controller comprises augmenting the control signals to thereby augment control of the actuator by the component controller.

The control signals may be first control signals and operation of the augmenting controller may further comprise generating and communicating second control signals to the actuator. The second control signals may cause the actuator to perform an operation not able to be caused by the component controller.

Operation of the augmenting controller may comprise processing algorithms that are related to drilling domain applications, thereby integrating the drilling domain applications with the component controller. In such implementations, among others within the scope of the present disclosure, the component controller may not be able to be programmed to process the algorithms, and/or the component controller may not have sufficient memory and/or processing power to process the algorithms.

Causing operation of the augmenting controller may comprise operating an HMI comprised by or interfaced with the augmenting controller.

Operation of the augmenting controller may comprise: receiving the control signals from the component controller and passing the control signals to the actuator without augmenting the control signals; and receiving the control signals from the component controller, augmenting the control signals, and communicating the augmented control signals to the actuator. In such implementations, among others within the scope of the present disclosure, operation of the augmenting controller may further comprise: generating additional control signals independent of the control signals received from the component controller; and communicating the generated additional control signals to the actuator.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. An apparatus comprising:
   an augmenting controller for augmenting control of an actuator by a component controller, wherein:
      the actuator is operable to change an operational parameter of a component of a drilling rig;
      the component controller is configured for communicating control signals to the actuator to control the actuator and thereby control operation of the component; and
      the augmenting controller is operable to augment the control signals.

2. The apparatus of claim 1 wherein:
   the control signals are first control signals; and
   the augmenting controller is operable to generate and communicate second control signals to the actuator.

3. The apparatus of claim 2 wherein the second control signals cause the actuator to perform an operation not able to be caused by the component controller.

4. The apparatus of claim 1 wherein the component controller does not communicate with the actuator other than through the augmenting controller.

5. The apparatus of claim 1 wherein the component controller communicates directly with the actuator.

6. The apparatus of claim 1 wherein the actuator is a variable frequency drive (VFD).

7. The apparatus of claim 6 wherein the component is a top drive driven by operation of the VFD.

8. The apparatus of claim 6 wherein the component is a drawworks driven by operation of the VFD.

9. The apparatus of claim 6 wherein the component is a mud pump system driven by operation of the VFD.

10. The apparatus of claim 1 wherein the augmenting controller is a personal computer (PC) based controller.

11. The apparatus of claim 10 wherein the component controller is a programmable logic controller (PLC).

12. The apparatus of claim 1 wherein the augmenting controller processes algorithms that are related to drilling domain applications and integrates the drilling domain applications with the component controller.

13. The apparatus of claim 12 wherein the component controller cannot be programmed to process the algorithms.

14. The apparatus of claim 12 wherein the component controller does not have sufficient memory and/or processing power to process the algorithms.

15. A system comprising:
   an actuator operable to change an operational parameter of a drilling rig component;
   a first controller configured for communicating control signals to the actuator to control the actuator and thereby control operation of the component; and
   a second controller connected between the first controller and the actuator and operable to alter the control signals.

16. The system of claim 15 wherein:
   the actuator is a variable frequency drive (VFD);
   the component is a top drive driven by operation of the VFD, a drawworks driven by operation of the VFD, or a mud pump system driven by operation of the VFD;
   the first controller is a programmable logic controller (PLC);
   the second controller is not a PLC;
   the second controller processes algorithms that are related to drilling domain applications and integrates the drilling domain applications with the first controller; and
   the first controller:
      cannot be programmed to process the algorithms; and/or
      does not have sufficient memory and/or processing power to process the algorithms.

17. The system of claim 16 wherein:
   the drilling domain applications include:
      a first algorithm to mitigate stick-slip occurrence during drilling; and
      a second algorithm to automatically control drilling;
   the control signals are first control signals;
   the actuator is a first VFD;
   the component is a top drive driven by operation of the first VFD;

the system further comprises:
　a second VFD operable to change an operational parameter of a drawworks; and
　a third controller configured for communicating second control signals to the second VFD to control the second VFD and thereby control operation of the drawworks; and
the second controller is also connected between the third controller and the second VFD and is operable to alter the second control signals.

18. A method comprising:
electronically connecting an augmenting controller to an actuator, wherein:
　the actuator is operable to change an operational parameter of a component of a drilling rig; and
　a component controller is configured for communicating control signals to the actuator to control the actuator and thereby control operation of the component; and
　causing operation of the augmenting controller, wherein operation of the augmenting controller comprises augmenting the control signals to thereby augment control of the actuator by the component controller.

19. The method of claim 18 wherein operation of the augmenting controller comprises:
　receiving the control signals from the component controller and passing the control signals to the actuator without augmenting the control signals;
　receiving the control signals from the component controller, augmenting the control signals, and communicating the augmented control signals to the actuator;
　generating additional control signals independent of the control signals received from the component controller; and
　communicating the generated additional control signals to the actuator.

* * * * *